United States Patent Office 2,880,133
Patented Mar. 31, 1959

2,880,133

METHOD OF REPELLING FISH COMPRISING TREATING WITH POTASSIUM PHENYL ACETATE

Arthur D. Hasler and Warren J. Wisby, Madison, Wis., assignors to the United States of America as represented by the Secretary of the Navy No Drawing. Application August 4, 1955
Serial No. 526,579

6 Claims. (Cl. 167—46)

This invention relates to a process for diverting fish from a given area and also to a fish repellant composition.

The problem of preventing fish of various species from entering streams, bays, channels or other specific areas as well as repelling them from a limited area within a body of water has presented itself in several types of situations wherein the erection of weirs or other visible structures may be neither practical nor desired for various reasons. For fish conservation purposes, for example, where a serious localized pollution particularly of a temporary nature is contemplated, it may be feasible to divert the fish from the area until the polluted condition is cleared or rendered nondestructive to fish life. In another type of situation involving the use of sonar equipment for locating physical objects in water, the dispersing of schools of fish from the vicinity is desirable since their presence is known to interfere with the effective operation of the echo-ranging sonar devices.

Effective fish repellants may also be utilized for affording protection to humans in emergency situations involving sea disasters wherein they may be subjected to attack by carnivorous fish, such as, sharks, barracuda and the like. The use of chemical reagents for repelling carnivorous fish from the proximity of humans is particularly desirable since the use of weapons and similar devices ordinarily causes the flow of blood which attracts packs of carnivorous fish to the scene.

Although chemical reagents characterized as fish repellants have been previously described, a disadvantage pertinent to their use, particularly for fish conservation purposes or for use in conjunction with sonar operations, has been the lack of marked potency for repelling purposes. It becomes necessary accordingly to use the substance or substances in relatively large amounts to attain the degree of concentration essential for evoking the desired avoidance response on the part of the fish. In view of the toxic nature of most of the known fish repellants, the use of substantial quantities aside from limitations based on cost, availability, etc. further presents a pollution hazard in and of itself whereby their usefulness for fish conservation applications is largely impaired. Also, the use of relatively large amounts of the known fish repellants for dispersing schools of fish from a limited area for sonar operations possess the further disadvantage of facilitating the detection by man of the treated water by means of either relatively simple chemical analyses or on the basis of such physical characteristics as color, odor, taste, etc. imparted to the water by the added reagent.

There is a need therefore for improved fish repellants of a chemical nature which possess enhanced potency characteristics whereby the use of smaller quantities provide the desired results without creating a pollution hazard. While fish repellants may be toxic to fish life when present in the water in excessive amounts, the need for extremely dilute solutions or trace amounts minimizes or completely eliminates the possibility of any appreciable damage because of pollution. As previously indicated, the fish repellant for use in dispersing schools of fish to improve sonar operation should preferably present no color, taste, odor or other indication which might make the treatment of the water apparent or readily detectable. The main advantage of a compound of improved potency for repelling the carnivorous forms of fish from humans resides in the extended protection which is afforded over a prolonged period of time from a limited supply of the repellant which would ordinarily be available in such situations.

It is accordingly an object of the present invention to provide a fish repellant composition having markedly enhanced potency characteristics compared to chemical reagents heretofore used for the purpose.

It is another object to provide an improvement in the process of treating water by means of adding a chemical reagent thereto to render the same more effectively repellant to fish at lower dilutions.

It is yet another object of this invention to provide a fish-repelling process of improved effectiveness without resorting to the use of weirs or other visible structures and also without creating a pollution hazard in the water.

A further object of the invention is to provide a process for treating water so as to disperse schools of fish from a limited area within a body of water without making the treatment of the water obvious or readily detectable to man.

A still further object is to provide a process for repelling carnivorous fish attackers whereby protection afforded humans otherwise exposed to their attacks is enhanced in effectiveness and duration.

Other objects and advantages will become apparent as the specification proceeds.

We have now discovered that the foregoing and related objects may be carried out by the addition of extremely minute quantities of potassium phenyl acetate to the water in the area or vicinity within the body of water from which it is desired to repel or divert various forms of fish life. Although the mechanism by which the avoidance response is evoked at the low dilutions involved is not clearly understood, it has been clearly established that the repelling potency of this reagent is vastly superior to any other chemical substance heretofore evaluated or used for the same purpose.

Potassium phenyl acetate which is the potassium salt of $\alpha$-toluic or phenylacetic acid is a colorless compound which is very soluble in fresh and sea water and is also highly stable under all conditions, particularly under those to which it may be exposed during prolonged storage. Thus, the substance may be stored indefinitely prior to use without any appreciable loss in its repelling potency. This property is particularly desirable in connection with its use in emergency situations in that together with other types of life-saving equipment, it may not be put into use for extended periods of time. Its favorable properties further facilitate its processing either alone or with other ingredients including solvents, suspending media, inert ingredients, etc., which may be used to provide the repellant in the form of a liquid preparation, pellet, dust spray, cartridge or any other physical state deemed desirable. The various types of preparations involve conventional processes and techniques which are well within the knowledge of those skilled in the art, and the particulars thereof require no further discussion herein.

The specific purpose behind the use of the fish repellant and available facilities for handling the same primarily determines the form of the preparation comprising a preferred embodiment. For example, whereas it may be desired to utilize a liquid or spray preparation for clearing fish from a particular area for achieving a widespread and relatively uniform distribution of the reagent in minimum time, the type of equipment or facilities available may be more suitably adapted for handling a solid preparation. On the other hand, for emergency use a packet containing either a solid or a liquid may be made available either as a separate unit or incorporated within the fabric of the life-saving equipment. For this use, the occasional need for protection from carnivorous fish over prolonged periods of time within a highly localized area may best be served by repellant preparations in cartridge form. Preferably, the cartridge consists of a matrix made of a material, such as a synthetic wax, which is only gradually soluble in water, thereby releasing the repelling reagent contained as a dispersed phase therein over a period of time. In this manner, the effectiveness of a limited amount may be extended over a maximum period of time. Similarly, a number of waterproof packages containing the fish repellant in any suitable form may be provided for use by opening as needed, thereby extending the protection period afforded by the reagent. Cartridges of a mechanical type containing the reagent under pressure may also be discharged as needed. In connection with the use of a fish repellant in carnivorous fish infested waters in emergency situations, the use of coloring materials together therewith for obliterating the vision of the potential attackers is well known. Coloring ingredients of animal, vegetable or mineral origin as carbon black, various metal oxides including iron, antimony, etc., and aniline and other dyestuffs and the like may be used in the formulation of appropriate potassium phenyl acetate preparations.

The efficacy of potassium phenyl acetate in extremely dilute solution is evidenced by the fact that fish placed in an aqueous solution containing as little as $1 \times 10^{-10}$ p.p.m. of the reagent not only avoid the medium whenever possible but also strive to escape by any means at their disposal. In fact, the first two clear water rinses of glassware which had contained the chemical at the above low concentration still repelled the fish to such an extent that few would enter the area thereof if a choice were made available. Detection of the compound in the water at such low concentrations would be virtually impossible since it is completely odorless to man and no discoloration of the water takes place.

The treatment of the water must necessarily be timed in accordance with the results sought to be achieved, it being obvious that in large bodies of water the localized concentrations of the reagent can, at best, be only of a temporary nature. Once the fish are repelled from a given area as a channel or bay, however, use may thereafter be made of weirs or other mechanical means for preventing their return. In the case of dispersing schools of fish on the high seas for improving the environment for sonar operations, it is obvious that the water should be treated periodically to avoid complete loss of repellancy by infinite dilution of the reagent with time.

Apparatus designed to test the reaction of fish to the odors of chemical reagents consisted of an enlarged central compartment into which four arms converged, thereby providing a four-way maze. Water was introduced into the upper end of each arm cascading down a series of eight small falls until it entered the center compartment, the base of which was equipped with a drain. The entrance to each arm was guarded by a gate and the four gates were arranged for simultaneous raising by pulling a single cord. A frame enclosure was provided for enclosing the apparatus with black drapes and, for observation purposes, panes of one-way glass were installed at each end.

After ascertaining that random distribution occurred in each of the four arms in that the fish placed in the central compartment showed no particular preference in specific arm visitations, the apparatus was adapted for introduction of known amounts of reagent into one of the arms. The reagent to be tested was placed in a separatory funnel which was calibrated to release its contents in eleven minutes. After the fish had been placed in the center compartment, the lights over the maze were turned off and the fish were left undisturbed for a ten-minute period for acclimatization. The stopper of the funnel was then turned on to discharge the reagent solution into the arm for one minute. At the end of the minute, the lights were turned on and the gates raised. Behavioral responses of the fish were observed through the one-way glass windows during the following ten minutes allowing for completion of the reagent addition after which the gates were lowered and the fish in each arm counted. Since preliminary tests had indicated that not all of the fish placed in the compartment could be expected to react during each test, i.e., enter one of the arms, the tabulations include only those fishes which had entered an arm.

Despite an extensive testing program carried out using the above apparatus and evaluation procedure involving the use of a rather large number of compounds of various types, no other chemical reagent was discovered that even remotely possessed the fish-repelling potency of potassium phenyl acetate at the low concentration levels. Its efficacy was found not to be limited to any particular fish species in that salmon, trout, minnows and other species reacted in substantially the same manner.

The following data are indicative of the effectiveness of potassium phenyl acetate (hereinafter referred to as KPA) utilizing fifty salmon fingerlings in each of the tests. In each case, the reagent was introduced via an arm No. 1 of the test apparatus.

| Reagent | Number of Tests | Conc. of Reagent, mg./liter | Arm No. 1 | Arm No. 2 | Arm No. 3 | Arm No. 4 |
|---------|-----------------|------------------------------|---|---|---|---|
| KPA | 7 | $1 \times 10^{-3}$ | 0 | 44 | 43 | 39 |
| KPA | 7 | $1 \times 10^{-4}$ | 1 | 61 | 63 | 46 |
| KPA | 8 | $1 \times 10^{-5}$ | 0 | 56 | 67 | 73 |
| KPA | 8 | $1 \times 10^{-6}$ | 8 | 62 | 52 | 56 |
| KPA | 9 | $1 \times 10^{-7}$ | 2 | 52 | 64 | 79 |
| KPA | 10 | $1 \times 10^{-10}$ | 5 | 47 | 66 | 54 |

Still further dilutions of the reagent produced no significant loss of repelling action. In fact, the amount of KPA retained as contamination after several rinses of the apparatus with fresh, uncontaminated water was sufficient to evoke a marked repelling action. Tests run on successive water rinses of the container just previously used for evaluations at a concentration of $1 \times 10^{-10}$ mg./liter of KPA gave the following results, again associating arm No. 1 with the chemical reagent:

| Fresh water rinse | Arm No. 1 | Arm No. 2 | Arm No. 3 | Arm No. 4 |
|-------------------|---|---|---|---|
| First | 1 | 6 | 7 | 12 |
| Second | 2 | 8 | 4 | 6 |
| Third | 1 | 16 | 11 | 8 |

It is thus seen that surprisingly enough the potency of KPA is still evident at levels of concentration too small to be measured by any known means. No odor which can be detected by man is associated with the compound even at the highest concentrations evaluated herein.

We claim:
1. A process for treating water to make the same repellant to fish life which comprises adding potassium phenyl acetate thereto in an amount sufficient to evoke an avoidance response from said fish life.
2. A process for treating water to make the same repellant to fish life which comprises adding potassium phenyl acetate to provide a concentration of about $1 \times 10^{-10}$ p.p.m. of the reagent in the portion of the water being treated.

3. A process for clearing fish from an area without polluting said area to a level harmful to said fish comprising adding a trace amount of potassium phenyl acetate to the water, said trace amount not exceeding a concentration of about $1 \times 10^{-7}$ mg./liter for any prolonged period of time.

4. A carnivorous fish repellant composition comprising a mixture of potassium phenyl acetate and coloring matter.

5. A carnivorous fish repellant composition consisting of a suspension of potassium phenyl acetate in a matrix of wax, said wax having a limited solubility in water for gradually releasing the suspension.

6. In a process for making an aqueous medium repellant to fish life wherein a chemical reagent is added thereto, the improvement comprising the step of adding to the aqueous medium potassium phenyl acetate to provide a concentration as low as about $1 \times 10^{-10}$ p.p.m. in said medium.

References Cited in the file of this patent

UNITED STATES PATENTS

| | | |
|---|---|---|
| 2,389,719 | Dinsley | Nov. 27, 1945 |
| 2,458,540 | Tuve et al. | Jan. 11, 1949 |

OTHER REFERENCES

Hiatt et al.: Biol. Bull., vol. 104, 1953, pp. 28–44, pp. 30–31 pert.

Smith: Chem. Abst., vol. 47, July-Sept. 1953, p. 8495d.

Handbook of Chem. and Physics, 35th ed., 1953-54, Chem. Rubber Pub. Co., page 1180.